Dec. 28, 1965    E. W. ANTHON    3,225,435
METHOD FOR ATTACHING CONNECTOR ELEMENTS TO
RESILIENTLY FLEXIBLE TUBING
Filed May 7, 1965
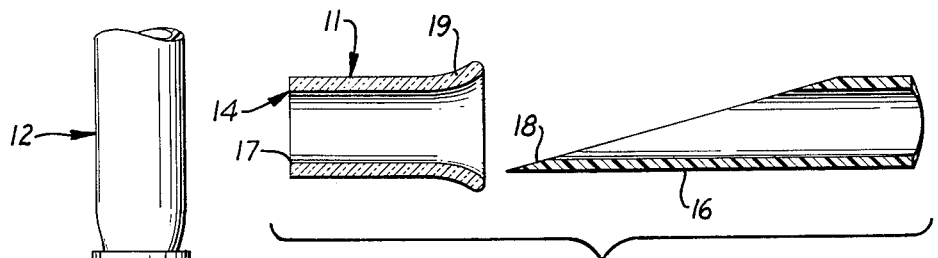
FIG. 2.
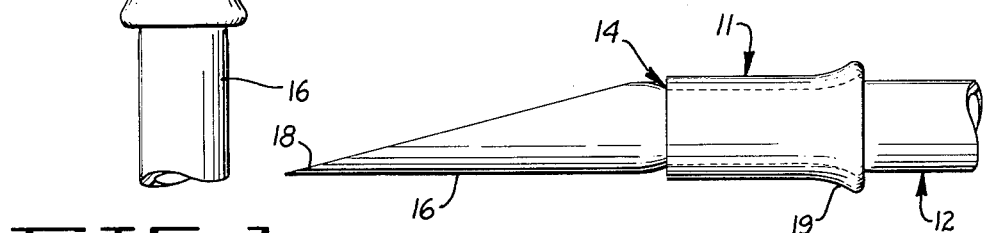
FIG. 1.
FIG. 3.
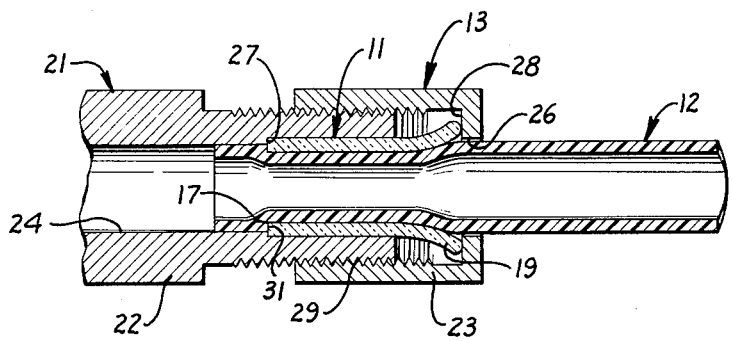
FIG. 4.
INVENTOR.
ERIK W. ANTHON
BY
Schapp & Hatch
ATTORNEYS 3,225,435
METHOD FOR ATTACHING CONNECTOR ELEMENTS TO RESILIENTLY FLEXIBLE TUBING
Erik W. Anthon, Kensington, Calif., assignor to Warner-Lambert Pharmaceutical Company, Morris Plains, N.J., a corporation of Delaware
Filed May 7, 1965, Ser. No. 454,085
6 Claims. (Cl. 29—432.2)

This invention relates to improvements in a method for attaching connector elements to resiliently flexible tubing, and more particularly to a method for attaching tubing formed of materials having a very low coefficient of friction. This application is a continuation-in-part of my application entitled Devices for Attaching Connector Elements to Resiliently Flexible Tubing, filed November 27, 1962 and having Serial No. 240,263, now abandoned.

The fastening of connecting elements to resiliently flexible tubing, such as plastic tubing having a low coefficient of friction, presents a number of problems. Materials such as polytetrafluoroethylene, commonly known as Teflon, are so slippery that it is almost impossible to make a firm attachment to previously known connecting devices. Because of its useful characteristics of being inert to most chemicals and relatively easy to fabricate, Teflon is being used more and more in chemical analytical instrumentation. Since many of these instruments operate at other than atmospheric pressure, the problem of attaching connecting devices to the Teflon tubing becomes more acute.

Most of the Teflon tubing presently in use is quite resilient and this resiliency, along with the inherent slipperiness of the materials, precludes the use of attaching devices which merely clamp the tube walls between rigid members. With such devices, the Teflon tubing will flow and pull out no matter how tightly clamped.

The present invention contemplates the use of an anchoring device which is preferably assembled by utilizing the resiliency of the tubing to hold the outer surface thereof in intimate contact with a sharp shoulder formed in the device and positioned to dig into the tubing and prevent the tubing from moving axially therepast. In this way, relatively slippery tubing may be held with a simple device. Although the invention will be described with particular reference to Teflon, it will be appreciated that the invention will be applicable to other tubing of similar properties, such as tubing made from polyethylene, polypropylene, fluoroethylenepropylene (FEP), and related plastics.

A still further object of the invention is to provide a method of securing an anchor suitable for coupling on the end portion of a slippery, flexible plastic tube in which the physical properties of the tube are utilized in the process.

Further objects and advantages of my invention will be apparent as the specification progresses, and the new and useful features of my method for attaching connector elements to resiliently flexible tubing will be fully defined in the claims attached hereto.

The preferred form of my invention is illustrated in the accompanying drawing forming part of this specification, in which:

FIGURE 1 is a side elevational view of a device constructed in accordance with the present invention and shown in assembled position on a section of tubing;

FIGURE 2, a longitudinal section through the device of FIGURE 1 and illustrating a preferred manner in which the end of the tubing is formed and positioned prior to the device being secured thereto;

FIGURE 3, a side elevational view of the device and associated tubing of FIGURE 2 with the tubing inserted into the device; and FIGURE 4, a longitudinal cross-sectional view of the device mounted on the end of a piece of tubing and having connector elements mounted thereon.

While I have shown only the preferred form of my invention, it should be understood that various changes or modifications may be made within the scope of the claims attached hereto without departing from the spirit of the invention.

Referring to the drawings in detail, it will be seen that the device of the present invention, which is adapted for attaching connector elements to a resiliently flexible tube, consists essentially of an anchoring sleeve 11 proportioned for encircling a resiliently flexible tube 12 and adapted for securing to a connector element 13, together with means 14 carried at the inner periphery of the sleeve 11 and engageable with the outer surface 16 of the tube 12 for retaining the latter against moving axially relative to the sleeve, the means 14 providing a sharpened shoulder formed to dig into the surface of the tube and prevent movement of the tube therepast.

In accordance with the present invention, the resiliency of the tubing material cooperates with the configuration of the sleeve 11 and the sharpened shoulder provided thereon by the means 14. This cooperation ensures that the shoulder is forced into intimate contact with the surface of the tubing. The sharpened shoulder provided by the means 14 may be positioned at any suitable location at the inner periphery of the sleeve 11 and may be provided by inwardly projecting teeth or ridges. However, I have found that it is much simpler and much more economical to provide the means 14 in the form of a sharpened rim 17 at an end of the sleeve 11, and to form the sleeve with an inside dimension providing a tight fit on the tube. The inherent resilience of the material will cause the tube to bulge outwardly at the rim 17, see FIGURE 4, thus causing the rim to dig into the tube surface and prevent the tube from being drawn further into the sleeve past the sharpened rim.

The sleeve 11 illustrated in the accompanying drawing is designed for mounting on an end of a section of tubing and incorporating a single sharpened rim 17 positioned to prevent the sleeve 11 from sliding off the end of the tube. In situations where it is desired to prevent axial movement of the sleeve relative to the tube in either direction, a similar sharpened rim 17 may be formed at the opposite end of the sleeve.

In accordance with the present invention and as an important feature thereof, I have found that the sharpened rim 17 may be easily and quickly provided by forming the sleeve 11 of glass and fracturing the sleeve transversely of its axis. The fracture characteristics of glass are such that an extremely sharp rim will be left at the intersection of the fracture with the inner periphery of the sleeve. Of course, other materials having fracture characteristics similar to those described may be used.

Since the anchoring sleeve 11 has an internal diameter smaller than the external diameter of the tube 12, certain techniques have been developed for assembling the anchoring sleeve without causing undue injury to the tube, and yet providing the assembly in a relatively simple manner. Briefly speaking, this assembly is achieved by reducing the size of an end portion of the plastic tube to provide an external diameter on said end portion smaller than the internal diameter of the anchoring sleeve, inserting the reduced end portion of the plastic tube through the anchoring sleeve with the reduced end going through the smooth end of the sleeve first, and providing an end of the tube extending beyond said sharp rim with a section of the tube being provided beyond the sharpened rim having an outside diameter larger than the internal diameter of the rim.

Several techniques may be utilized for providing the reduced diameter on the end portion of the tube and thence providing the end section having an increased diameter for the finished assembly. One way which might be used utilizes the fact that Teflon and equivalent materials may be contracted mechanically to reduce its diameter. When such mechanical contraction is provided, the tube will contain internal stresses, and when the tube is heated to the gel point, it tends to expand to its original diameter on cooling. The gel point of a typical Teflon sample is 621° F., but it should be understood that the gel point will vary depending on the particular structure and molecular weight of the solid polytetrafluoroethylene or the like which is used. A more complete description of this technique of mechanical working combined with heating is given in the two United States patents to St. John et al., Nos. 3,050,786, issued August 28, 1962, and 3,085,483, issued April 16, 1963.

The above technique is given by way of example to illustrate the generic concept of the invention, but it is not the preferred system since it requires mechanical working and heating. Instead, it is preferred to cut off the reduced end portion of the tube and discard it, since the cost of this piece of tubing is minimal in comparison to the heating step saved.

Thus, in the preferred embodiment, the reduced end portion may be provided by drawing out an end section of the tube or, in the preferred form shown in the drawings, by cutting the tube in the form of a taper. The cutting of the tube in the form of a taper is preferred because it provides better control. In both cases, the end is inserted through the sleeve and pulled therethrough until the sleeve is pulled over a section of the tubing which has not been cut or drawn. The resiliency of the tubing allows it to collapse momentarily and then assume its size to provide a bulge on the other side of the tube, as illustrated in the drawings. The reduced end is then cut off to complete the desired assembly.

The preferred technique is illustrated in FIGURES 2 through 4 of the drawings, where a long tapered point 18 is formed by slicing the tube at an angle. The tapered portion is preferably somewhat longer than the sleeve so that the point 18 can be pushed entirely therethrough. The point 18 may then be grasped, as with pliers, for pulling the tubing through the sleeve.

This pulling of the tubing through the sleeve is made much easier by forming the end of the sleeve opposite to the sharpened rim 17 with an outwardly flared portion 19. When the point 18 is grasped by the pliers and pulled upon, the tubing will be gradually compressed by the flared portion and can easily be drawn through the sleeve. After the tube is in the correct position within the sleeve, the tapered portion may be cut off as shown in FIGURE 4.

As may be seen from FIGURE 4, with the sleeve 11 properly positioned on the tube 12, the sleeve will serve as an anchor for securing other connector elements 21 to the tubing. As here shown, a suitable connector element 21 is provided in the form of a pair of members 22 and 23 having cylindrical bores 24 and 26 mounted in encircling relation around the sleeve. The members 22 and 23 are formed with confronting shoulders 27 and 28 engageable with the opposite ends of the sleeve, the members being formed with a threaded connection 29 for clamping the sleeve 11 between the shoulders 27 and 28. As will be apparent, any desired type of coupling, connector, etc. may be secured to the members 22 or 23 in any conventional manner.

It should also be noted that the sharpened rim 17 will bite into the tube and the tube will flow against the rim to form a shoulder 31 when the tube is pulled axially against the anchoring sleeve 11. This configuration is shown in FIGURE 4, which also shows a confining wall on member 22. This wall cooperates with the rim of sleeve 11 to confine the tube end in the desired configuration.

From the foregoing, it will be seen that I have provided a novel device for attaching objects to a resiliently flexible tube, formed of Teflon or like material, with the structural configuration of the device cooperating with the inherent properties of the tubing to provide a firm and positive attachment.

I claim:

1. A method for assembling an anchoring sleeve on a resiliently flexible plastic tubing comprising the steps of selecting a piece of brittle tubing having an internal diameter slightly smaller than the external diameter of the plastic tubing, fracturing the brittle tubing transversely of its axis to provide an anchoring sleeve having a sharpened rim at one end thereof, reducing the size of an end portion of the plastic tube to provide an external diameter smaller than the internal diameter of the anchoring sleeve throughout a length of tubing which is longer than the sleeve, inserting the reduced end portion of the plastic tube through the anchoring sleeve with the anchoring sleeve oriented so that the tube goes through the sharpened rim of the anchoring sleeve last, and providing an end of the tube extending beyond said sharpened rim with an outside diameter larger than the internal diameter of the rim.

2. A method for applying an anchoring sleeve on resiliently flexible plastic tubing comprising the steps of selecting a piece of glass tubing having an internal diameter slightly smaller than the external diameter of the plastic tubing, providing a smooth flared opening at one end of the glass tubing, providing a sharp rim at the opening at the other end of the glass tubing, said glass tubing thus prepared forming an anchoring sleeve having a smooth flared end and an end containing a sharp rim, reducing the size of an end portion of the plastic tubing to provide an external diameter smaller than that of the anchoring sleeve throughout a length of tubing which is longer than the sleeve, inserting the reduced end portion of the plastic tubing through the anchoring sleeve with the reduced end going through the smooth end of the sleeve first, and providing an end of the tubing extending beyond said sharpened rim with an outside diameter larger than the internal diameter of the rim.

3. A method for applying an anchoring sleeve on resiliently flexible plastic tubing comprising the steps of selecting a piece of glass tubing having an internal diameter slightly smaller than the external diameter of the plastic tubing, enlarging one end of the glass tubing an amount sufficient to allow easy insertion of the plastic tubing therein, fracturing the glass tubing transversely of its axis to provide the other end with a sharpened rim, said glass tubing thus forming an anchoring sleeve having a smooth flared end and an end containing a sharp rim, reducing the size of an end portion of the plastic tubing to provide an external diameter smaller than that of the anchoring sleeve throughout a length of tubing which is longer than the sleeve, inserting the reduced end portion of the plastic tubing through the anchoring sleeve with the reduced end going through the smooth end of the sleeve first, and providing an end of the tubing extending beyond said sharpened rim with an outside diameter larger than the internal diameter of the rim.

4. A method for applying an anchoring sleeve on resiliently flexible plastic tubing comprising the steps of selecting a piece of glass tubing having an internal diameter slightly smaller than the external diameter of the plastic tubing, enlarging one end of the glass tubing an amount sufficient to allow easy insertion of the plastic tubing therein, fracturing the glass tubing transversely of its axis to provide the other end with a sharpened rim, said glass tubing thus forming an anchoring sleeve having a smooth flared end and an end containing a sharp rim, reducing the size of an end portion of the plastic tubing to provide an external diameter smaller than that of the anchoring sleeve throughout a length of tubing which is longer than the sleeve, inserting the reduced end portion of the plastic tubing through the anchoring sleeve with the reduced end going through the smooth end of the sleeve first, drawing the plastic tube through the sleeve until all of the reduced end portion together with a section of the tube that was not reduced has been passed through the sleeve, and cutting off the reduced end portion at a position somewhat removed from the sharp rim of the sleeve to leave an end of the tubing extending beyond the sharpened rim with the outside diameter on the tube end being larger than the internal diameter of the rim.

5. The method for applying an anchoring sleeve defined in claim 4, in which the plastic tubing is composed of polytetrafluoroethylene.

6. A method for applying an anchoring sleeve on resiliently flexible plastic tubing comprising the steps of selecting a piece of glass tubing having an internal diameter slightly smaller than the external diameter of the plastic tubing, enlarging one end of the glass tubing an amount sufficient to allow easy insertion of the plastic tubing therein, fracturing the glass tubing transversely of it axis to provide the other end with a sharpened rim, said glass tubing thus forming an anchoring sleeve having a smooth flared end and an end containing a sharp rim, cutting the plastic tube angularly of its axis to provide a tapered end longer than the anchoring sleeve, inserting the tapered end of the plastic tube through the anchoring sleeve with the tapered end going through the smooth end of the sleeve first, drawing the plastic tube through the sleeve until all of the tapered portion extends clear through and a section of the tube is provided beyond the sharpened rim having an outside diameter larger than the internal diameter of the rim, and cutting off the tapered portion of the plastic tube to provide a regular cut in juxtaposed position to the end of the anchoring sleeve.

References Cited by the Examiner
UNITED STATES PATENTS

| | | | |
|---|---|---|---|
| 1,755,210 | 4/1930 | Dohner | 29—413 |
| 2,152,537 | 3/1939 | Coaty | 285—249 |
| 2,787,480 | 4/1957 | Staller | 285—238 |
| 2,857,176 | 10/1958 | McTaggart et al. | 285—177 X |
| 2,874,981 | 2/1959 | Brady | 285—238 |
| 2,944,325 | 7/1960 | Clark | 29—450 X |
| 3,016,605 | 1/1962 | Heckethorn | 29—453 |
| 3,127,672 | 4/1964 | Kretschmer | 29—450 |

WHITMORE A. WILTZ, *Primary Examiner.*